US009678836B1

(12) United States Patent
Westenberg (10) Patent No.: US 9,678,836 B1
(45) Date of Patent: Jun. 13, 2017

(54) SYSTEMS AND METHODS FOR MANAGING DATA PROTECTION OF STORAGE UNITS

(75) Inventor: Guido Westenberg, Columbia Heights, MN (US)

(73) Assignee: Veritas Technologies, Mountain View, CA (US)

( * ) Notice: Subject to any disclaimer, the term of this patent is extended or adjusted under 35 U.S.C. 154(b) by 837 days.

(21) Appl. No.: 13/543,717

(22) Filed: Jul. 6, 2012

(51) Int. Cl.
*G06F 11/14* (2006.01)

(52) U.S. Cl.
CPC .................. *G06F 11/1458* (2013.01)

(58) Field of Classification Search
None
See application file for complete search history.

(56) References Cited

U.S. PATENT DOCUMENTS

| 7,827,608 | B2 * | 11/2010 | Bird .................. G06F 17/30306 380/200 |
| 7,840,595 | B1 * | 11/2010 | Blitzer ................ G06F 11/1458 707/781 |
| 8,244,792 | B2 * | 8/2012 | Boaz .................. G06F 11/1451 707/650 |
| 2009/0300706 | A1 * | 12/2009 | Ray ....................... G06F 21/604 726/1 |
| 2010/0088581 | A1 * | 4/2010 | Koppich ........... G06F 17/30011 715/200 |
| 2011/0154502 | A1 * | 6/2011 | Prakash ................ G06F 1/1677 726/26 |
| 2012/0089572 | A1 * | 4/2012 | Raichstein .......... G06F 17/3015 707/645 |
| 2012/0154166 | A1 * | 6/2012 | Yu ......................... G06F 11/324 340/815.45 |

* cited by examiner

*Primary Examiner* — Tae Kim
*Assistant Examiner* — Shiuh-Huei Ku
(74) *Attorney, Agent, or Firm* — FisherBroyles LLP (57) ABSTRACT

A computer-implemented method for managing data protection of storage units may include 1) providing a user interface that enables a user to configure data protection policies for storage units, 2) selecting at least one storage unit for data protection, 3) enabling the user to configure, through the user interface, a data protection policy to schedule a data backup of the storage unit, and 4) enabling the user to configure, through the same user interface, the same data protection policy to schedule a data transfer operation from the storage unit to an additional storage unit. The data transfer operation may include at least one of a replication operation and a continuous data protection operation. Various other methods, systems, and computer-readable media are also disclosed.

20 Claims, 7 Drawing Sheets

SYSTEMS AND METHODS FOR MANAGING DATA PROTECTION OF STORAGE UNITS

BACKGROUND

Persons and organizations may desire to protect their personal and business data. There are multiple options for performing data protection. More traditional options may include data backup and snapshot backup. A data backup may simply copy data from one storage unit to another storage unit. A snapshot backup may copy all of the data on a storage unit as it exists at a particular point in time.

Less traditional options for data protection may include replication and continuous data protection, as discussed further below. Conventionally, more traditional data protection operations, like data backup, and less traditional ones, like replication, have not been included within the same data protection applications, user interfaces, and/or data protection policies. The separation of these data protection options in different applications, interfaces, and/or policies has made management of multiple data protection options more difficult and cumbersome.

SUMMARY

As will be described in greater detail below, the instant disclosure generally relates to systems and methods for managing data protection of storage units.

In one example, a computer-implemented method for managing data protection of storage units may include 1) providing a user interface that enables a user to configure data protection policies for storage units, 2) selecting at least one storage unit for data protection, 3) enabling the user to configure, through the user interface, a data protection policy to schedule a data backup of the storage unit, and 4) enabling the user to configure, through the user interface, the data protection policy to schedule a data transfer operation from the storage unit to an additional storage unit. In this example, the data transfer operation may include at least one of a replication operation and a continuous data protection operation.

In certain embodiments, scheduling the data transfer operation may include discovering replication capabilities of the storage unit. In these embodiments, scheduling the data transfer operation may also include enabling the user to configure replication based on the discovered replication capabilities.

In some embodiments, scheduling the data transfer operation may also include selecting at least one of synchronous replication, asynchronous replication, and periodic replication. In such embodiments, scheduling the data transfer operation may further include selecting an update frequency for the periodic replication.

In one example, enabling the user to configure the data protection policy to schedule the data backup and the data transfer operation may include receiving a user selection of the storage unit. In this example, enabling the user to configure the data protection policy to schedule the data backup and the data transfer operation may also include displaying a range of data protection options in response to receiving the user selection. In this example, the range of data protections options may include both the data backup and the data transfer operation.

In some examples, enabling the user to schedule the data transfer operation may include receiving the user selection from the range of data protection options indicating replication of the storage unit. In these examples, enabling the user to schedule the data transfer operation may also include receiving user input designating a storage device for the additional storage unit to which the storage unit will be replicated.

According to at least one embodiment, the method may also include taking a snapshot of the storage unit using the additional storage unit to which the storage unit is configured to perform the data transfer operation. In some embodiments, the method may further include visually depicting the additional storage unit as a separate replica of the storage unit in the user interface. In such embodiments, visually depicting the additional storage unit as a separate replica may include visually depicting the additional storage unit as a separate replica in response to receiving user input that configures replication of the storage unit.

In one embodiment, the data backup and replication may be distinct in that replication maintains the storage unit and the additional storage unit in a substantially synchronized state whereas the data backup does not. In another embodiment, the data backup and replication may be distinct in that replication ensures that replication of a write operation is performed to the additional storage unit before the write operation is actually performed on the storage unit whereas the data backup does not.

In one embodiment, a system for implementing the above-described method may include 1) a provisioning module programmed to provide a user interface that enables a user to configure data protection policies for storage units, 2) a selection module programmed to select at least one storage unit for data protection, 3) an enablement module programmed to enable the user to configure, through the user interface, a data protection policy to schedule a data backup of the storage unit, and further programmed to enable the user to configure, through the user interface, the data protection policy to schedule a data transfer operation from the storage unit to an additional storage unit, and 4) at least one processor configured to execute the provisioning module, the selection module, and the enablement module. In this embodiment, the data transfer operation may include at least one of a replication operation and a continuous data protection operation.

In some examples, the above-described method may be encoded as computer-readable instructions on a computer-readable-storage medium. In these examples, a computer-readable-storage medium may include one or more computer-executable instructions that, when executed by at least one processor of a computing device, may cause the computing device to 1) provide a user interface that enables a user to configure data protection policies for storage units, 2) select at least one storage unit for data protection, 3) enable the user to configure, through the user interface, a data protection policy to schedule a data backup of the storage unit, and 4) enable the user to configure, through the user interface, the data protection policy to schedule a data transfer operation from the storage unit to an additional storage unit. In these examples, the data transfer operation may include at least one of a replication operation and a continuous data protection operation.

As will be explained in greater detail below, the systems and methods described in this application may enable a user to manage, in the same policy and/or user interface, traditional data backup or snapshot operations as well as less traditional data transfer operations for the same storage unit or other computing system. The less traditional data transfer operations may include replication and/or continuous data protection. The systems and methods described herein may also enable a user to more easily manage traditional data backup or snapshot operations, as well as less traditional data transfer operations, on replicas of primary storage units.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
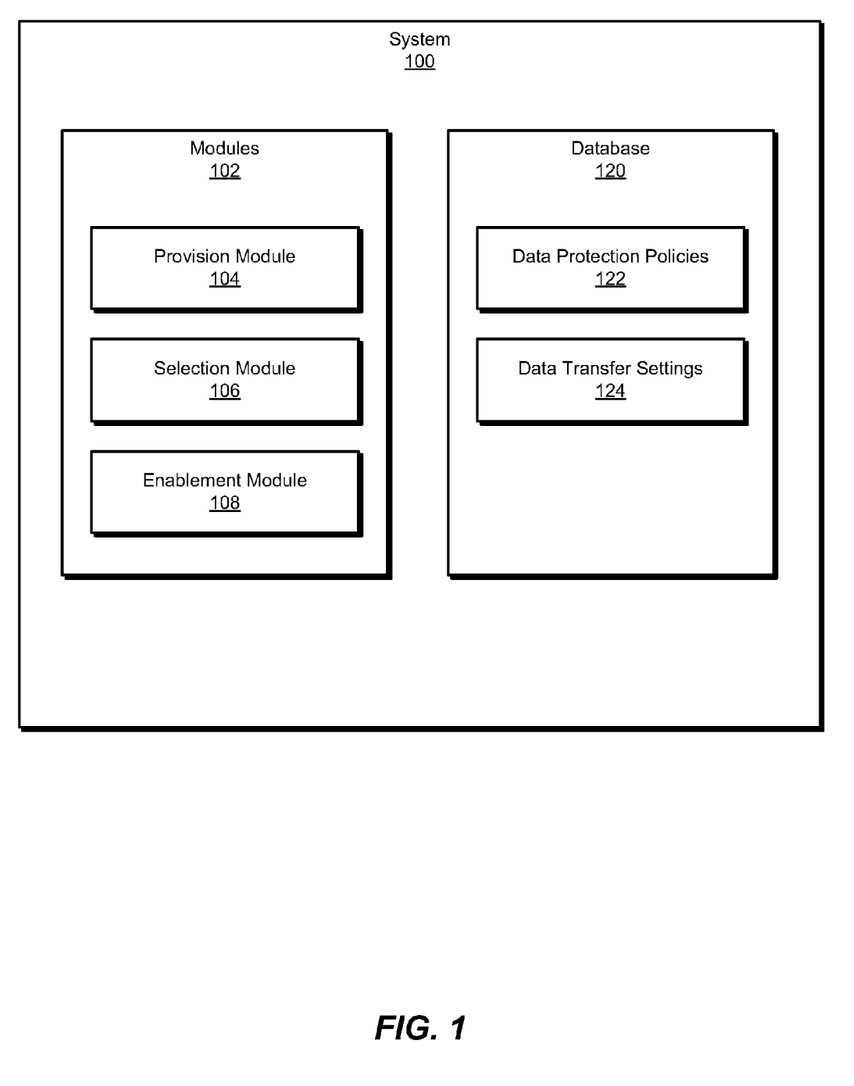
FIG. 1 is a block diagram of an exemplary system for managing data protection of storage units.
Figure 2:
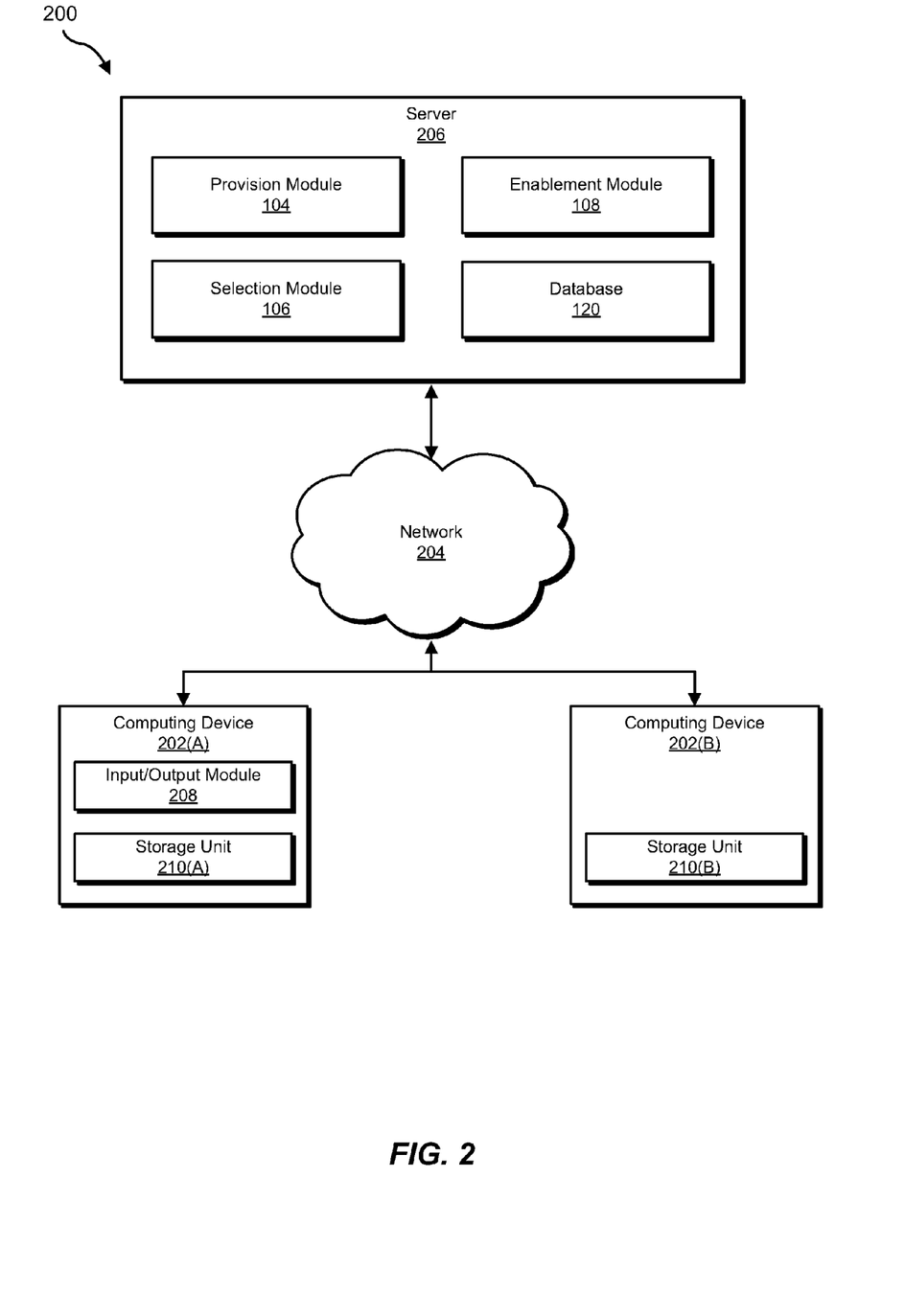
FIG. 2 is a block diagram of an exemplary system for managing data protection of storage units.

The following will provide, with reference to FIGS. 1-2, detailed descriptions of exemplary systems for managing data protection of storage units. Detailed descriptions of corresponding computer-implemented methods will also be provided in connection with FIG. 3. Detailed descriptions of a corresponding graphical user interface will further be provided in connection with FIGS. 4 and 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for managing data protection of storage units. As discussed herein, a storage unit may refer to a physical storage unit, such as a hard disk, or a virtual storage unit, such as a volume in a redundant array of independent disk(s) (RAID), as well as a file, partition, or hard disk volume.

As illustrated in FIG. 1, exemplary system 100 may include one or more modules 102 for performing one or more tasks. For example, and as will be explained in greater detail below, exemplary system 100 may include a provisioning module 104 programmed to provide a user interface that enables a user to configure data protection policies for storage units. Exemplary system 100 may also include a selection module 106 programmed to select at least one storage unit for data protection.

In addition, and as will be described in greater detail below, exemplary system 100 may include an enablement module 108 programmed to enable the user to configure, through the user interface, a data protection policy to schedule a data backup of the storage unit. Enablement module 108 may further be programmed to enable the user to configure, through the user interface, the data protection policy to schedule a data transfer operation from the storage unit to an additional storage unit. The data transfer operation may include at least one of a replication operation and a continuous data protection operation.

Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(A) and 202(B) and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store data protection policies 122. Database 120 may also include data transfer settings 124. Data transfer settings 124 may include settings for configuring data transfer operations such as replication or continuous data management, as discussed further below.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include computing devices 202(A) and 202(B) in communication with a server 206 via a network 204.

In one embodiment, one or more of modules 102 from FIG. 1 may, when executed by at least one processor of computing device 202(A), enable computing device 202(A) for managing data protection of storage units. For example, and as will be described in greater detail below, one or more of modules 102 may cause computing device 202(A) to 1) provide a user interface that enables a user to configure data protection policies for storage units, 2) select at least one storage unit for data protection, 3) enable the user to configure, through the user interface, a data protection policy to schedule a data backup of the storage unit, and 4) enable the user to configure, through the user interface, the data protection policy to schedule a data transfer operation from the storage unit to an additional storage unit. The data transfer operation may include at least one of a replication operation and a continuous data protection operation. Computing device 202(A) may include an input/output module 208 for interacting with a user. Input/output module 208 may interface with input devices, such as a keyboard and mouse, and output devices such as a graphical display. One or more of modules 102 from FIG. 1, as well as input/output module 208, may be alternatively, or additionally, be located in server 206 instead of computing device 202(A).

Computing devices 202(A) and 202(B) generally represent any type or form of computing device capable of reading computer-executable instructions. Examples of computing devices 202(A) and 202(B) may include, without limitation, laptops, tablets, desktops, servers, cellular phones, personal digital assistants (PDAs), multimedia players, embedded systems, combinations of one or more of the same, exemplary computing system 610 in FIG. 6, or any other suitable computing device. In some examples, the computing device may simply include a storage unit such as a hard disk or disk array. Computing device 202(B) represents such an example.

Server 206 generally represents any type or form of computing device capable of managing data protection of storage units. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing device 202(A) or computing device 202(B) and server 206.

In the example of FIG. 2, server 206 may manage data protection of a storage unit located in computing device 202(A). For example, server 206 may manage traditional data backup or snapshot backup of a storage unit 210(A) in computing device 202(A) to storage unit 210(B) in computing device 202(B). Server 206 may also manage data transfer operations including replication and continuous data protection from storage unit 210(A) in computing device 202(A) to storage unit 210(B) in computing device 202(B).

Figure 3:
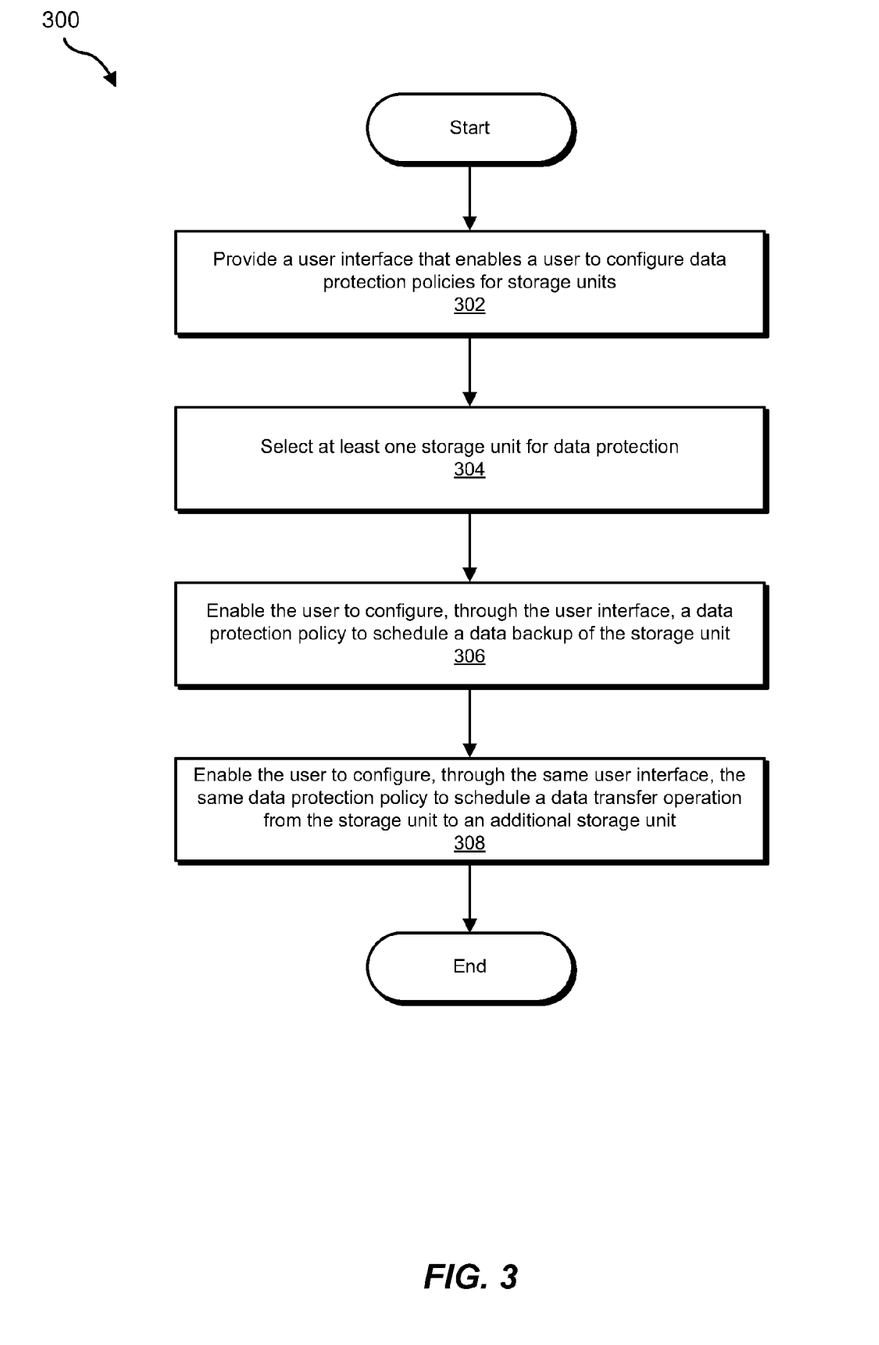
FIG. 3 is a flow diagram of an exemplary method for managing data protection of storage units.

FIG. 3 is a flow diagram of an exemplary computer-implemented method 300 for managing data protection of storage units. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

At step 302, one or more of the systems described herein may provide a user interface that enables a user to configure data protection policies for storage units. For example, at step 302 provisioning module 104 may provide a user interface that enables a user to configure data protection policies for storage units.

Provisioning module 104 may provide the user interface in a variety of manners. Provisioning module 104 may graphically display the user interface on a display device. Provisioning module 104 may display the user interface in response to a user request to view the user interface or to manage a data protection policy. As defined herein, a data protection policy refers to a unified set of rules or settings for protecting data on at least one specified storage unit or computing device. The rules or settings may be unified in that a data protection system associates the rules or settings together in the same data protection policy. The unified rules and settings may be enabled, or disabled, together by toggling the data protection policy.

Provisioning module 104 may also display the user interface automatically upon the satisfaction of one or more predefined conditions. These predefined conditions may include the occurrence of an event, such as a designated time, a request to restore protected data, a fault or failure to perform a data protection operation, to perform a read/write operation, or to access a storage unit, and/or the selection of a storage unit for data protection management.

Provisioning module 104 may display a number of selectable buttons or other graphical items that enable the user to access data protection settings. Data protection settings may include data transfer settings in data transfer settings 124. Provisioning module 104 may modify the display of the user interface in response to user input. Provisioning module 104 may also, or alternatively, output any part of the user interface through an audio device instead of displaying on a visual device.

Figure 4:
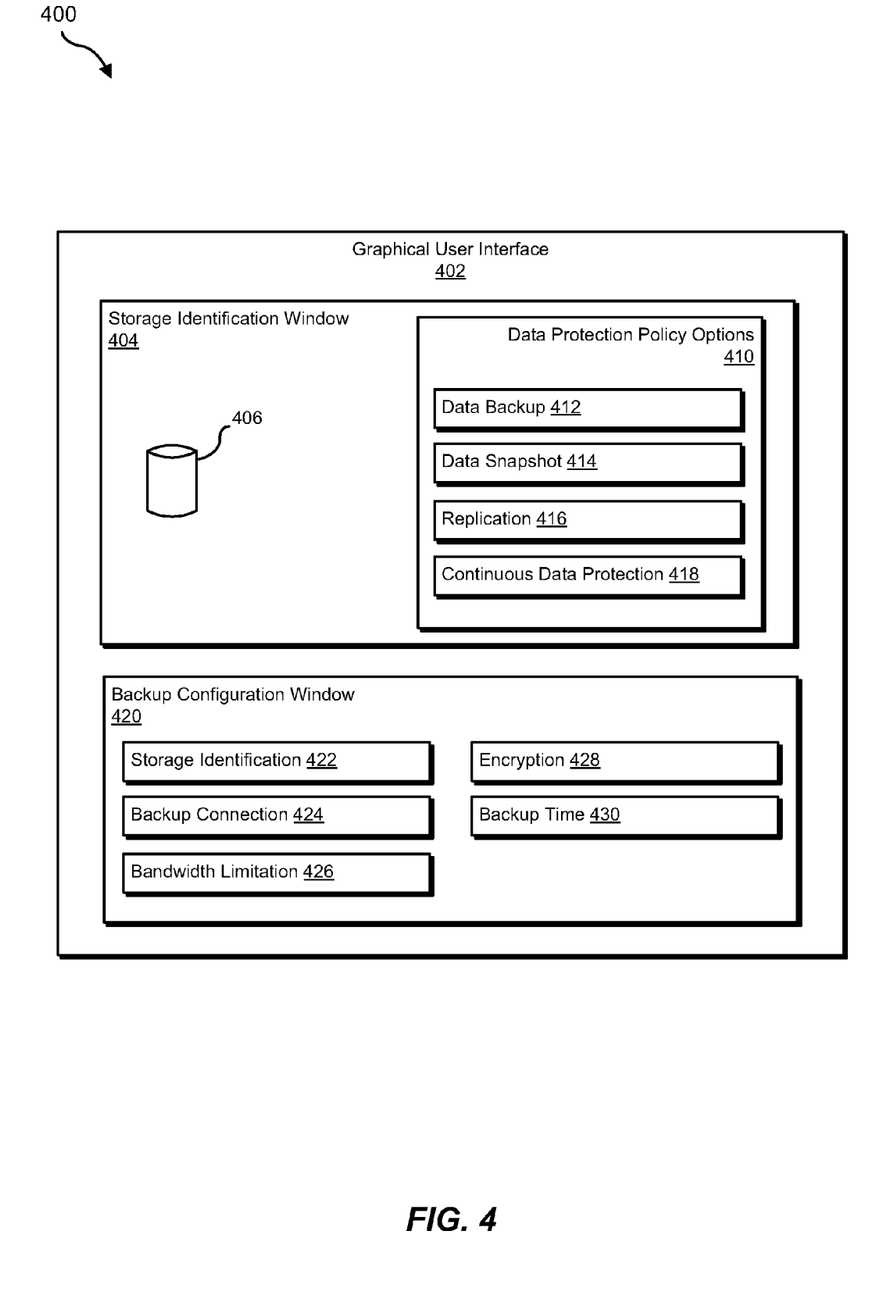
FIG. 4 is a block diagram of an exemplary graphical user interface for configuring data backup.

FIG. 4 includes a block diagram 400 of a graphical user interface 402 for managing data backup. Graphical user interface 402 may be an example of the user interface that provisioning module 104 provides to the user. As shown in FIG. 4, graphical user interface 402 may include a storage identification window 404, data protection policy options 410, and a backup configuration window 420. Storage identification window 404 may include a graphical icon representing a storage unit 406. Data protection policy options 410 may include several options for data protection operations to be performed on at least one storage unit, such as storage unit 406. Enablement, and disablement, of options in data protection policy options 410 may be unified in a single data protection policy for at least one specified storage unit. The user may select one or more of the options in data protection policy options 410 to enable the selected option on the storage unit.

Data protection policy options 410 may include data backup 412, data snapshot 414, replication 416, and continuous data protection 418. Data backup 412 may indicate traditional data backup without ensuring that the primary and secondary storage units are synchronized. (Primary and secondary storage units may correspond to storage units 210(A) and 210(B), respectively, in FIG. 2, for example.) In other words, by the time that a data backup operation transfers all protected data from the primary storage unit to the secondary storage unit, the same data might have changed at the primary storage unit. In this case, the primary and secondary storage units would not be synchronized upon completion of the data backup. Similarly, data backup 412 may also fail to ensure that all of the protected data transferred to the secondary storage unit represents a state of the primary storage unit as a single unified point in time. Rather, data backup 412 may transfer data from the primary storage unit to the secondary storage unit across a range of time so that the backup copy at the secondary storage unit does not correspond to a single point in time.

Data snapshot 414 may indicate a traditional data backup, like data backup 412, with one exception. The exception is that data snapshot 414 ensures that the backup copy at the secondary storage unit indicates all of the protected data on the primary storage unit at a single point in time (e.g., a snapshot of the primary storage unit). As described herein, a data snapshot may correspond to a type of data backup.

Replication 416 may indicate replication of a primary storage unit to another secondary storage unit. As described herein, replication refers to copying all protected data from the primary storage unit to the secondary storage unit in a continuous, or substantially continuous, process to ensure that the secondary storage unit is substantially up-to-date. Replication thereby ensures that the secondary storage unit substantially mirrors the primary storage unit. In other words, replication may thereby ensure that the primary and secondary storage units are maintained in a synchronized, or substantially synchronized, state. Replication to the secondary storage unit may typically overwrite data indicating an earlier state of the primary storage unit when the earlier state changes to a later stage. In contrast, data backup 412 and data snapshot 414 may typically create new backups without overwriting previously-created backups. Data backup and replication may be distinct in that replication maintains the storage unit and the additional storage unit in a substantially synchronized state whereas the data backup does not. Data backup and replication may also be distinct in that replication ensures that replication of a write operation is performed to the additional storage unit before the write operation is actually performed on the storage unit, but data backup does not.

Continuous data protection 418 may indicate continuous data protection of a primary storage unit. As described herein, continuous data protection refers to copying all, or substantially all, changes that are made to a primary storage unit to a secondary storage unit. By recording all changes made to a primary storage unit, continuous data protection may enable a user to restore data from the primary storage unit at any arbitrary point in time while the primary storage unit was under continuous data protection.

As shown in FIG. 4, graphical user interface 402 may include both traditional data protection options, such as data backup 412 and data snapshot 414, as well as additional protection options, such as replication 416 and continuous data protection 418. Although shown as graphical user interface windows in FIG. 4, provisioning module 104 may provide storage identification window 404, data policy protection options 410, and backup configuration window 420 through any appropriate user interface, including a command prompt and/or audio interface.

Returning to FIG. 3, at step 304 one or more of the systems herein may select at least one storage unit for data protection. For example, at step 304 selection module 106 may select at least one storage unit for data protection.

Selection module 106 may select at least one storage unit for data protection in a variety of manners. For example, selection module 106 may select the storage unit upon receiving a user selection of a storage unit. The user may select a storage unit through any appropriate visual or auditory user interface.

For example, the user may select an icon, such as the icon for storage unit 406 in storage identification window 404 in FIG. 4. Selection module 106 may also prompt the user to select a storage unit. Selection module 106 may also propose at least one candidate storage unit for user selection. Upon prompting, the user may select the storage unit from among a range of candidate storage units based on the proposal of selection module 106.

Selection module 106 may also automatically, or autonomously, select a storage unit based on one or more predefined conditions, settings, and/or heuristics. For example, selection module 106 may autonomously select a storage unit based on the storage unit's available storage capacity, read/write speeds and abilities, replication and data protection capabilities, network connectivity, and/or measured past performance. Selection module 106 may enable the user to manually override a selection that selection module 106 autonomously made.

Returning to FIG. 3, at step 306 one or more of the systems described herein may enable the user to configure, through the user interface, a data protection policy to schedule a data backup of the storage unit. For example, at step 306 enablement module 108 may enable the user to configure, through the user interface, a data protection policy to schedule a data backup of the storage unit.

Enablement module 108 may enable the user to configure the data protection policy to schedule a data backup of the storage unit in a variety of manners. For example, enablement module 108 may display a range of data protection options for a specified storage unit or computing system. Enablement module 108 may display the range of options in response to reception of a storage unit selection by selection module 106. Alternatively, enablement module 108 may display the range of options before the user selection is received (e.g., continuously display the range of options).

Data protection policy options 410 in FIG. 4 may correspond to the range of options displayed by enablement module 108. Enablement module 108 may display data protection policy options 410 upon the user selecting a storage unit, such as storage unit 406. As shown in FIG. 4, the range of options may include data backup 412, data snapshot 414, replication 416, and continuous data protection 418. Thus, the range of options may include both a data backup and a data transfer operation of replication or continuous data protection. Although shown as a graphical user interface window in FIG. 4, enablement module 108 may output the range of options in any appropriate format.

Enablement module 108 may enable the user to schedule the data backup in part by enabling the user to configure data backup settings. For example, enablement module 108 may enable the user to identify a secondary storage unit to which the backup of protected data is being stored. As one example, enablement module 108 may enable the user to identify the secondary storage unit by selecting button storage identification 422 in FIG. 4. The secondary storage unit may correspond to a file (e.g., a disk image file), a partition, a volume, a physical disk, or a virtual disk volume or array of disks. The secondary storage unit may be included within computing device 202(A) (e.g., as a separate file, partition, or volume in the same physical disk or as a separate physical disk in the same computing device), or within computing device 202(B).

Enablement module 108 may also enable the user to configure a network connection for the data backup operation. For example, enablement module 108 may enable the user to select at least one of several wired or wireless network connections over which to perform the data backup (e.g., when storing the data backup on computing device 202(B)). In the example of FIG. 4, enablement module 108 may enable the user to configure the network connection upon selecting backup connection 424.

Enablement module 108 may also enable the user to select a bandwidth limitation for performing the data backup operation. The bandwidth limitation may indicate a maximum bandwidth that the data backup operation is permitted to consume across the network connection (e.g., across network 204 and/or the network connection selected according to backup connection 424). In the example of FIG. 4, enablement module 108 may enable the user to select the bandwidth limitation by selecting bandwidth limitation 426.

Enablement module 108 may also enable the user to configure encryption settings for the data backup. For example, the user may indicate whether the backup and/or network connection will be encrypted. The user may also designate a type of encryption. In the example of FIG. 4, enablement module 108 may enable the user to configure encryption settings by selecting encryption 428.

Enablement module 108 may also enable the user to configure a backup time for the data backup. For example, the user may specify a particular day and time for the data backup. The user may also specify a particular interval or period for the data backup (e.g., weekly). The user may also configure settings that define a flexible time or window of time during which enablement module 108 (or another module) may perform the data backup. For example, the user may designate a time period during which enablement module 108 should perform the data backup if and when the primary computing system (e.g., computing device 202(A)) is idle for an extended or predetermined amount of time. In the example of FIG. 4, enablement module 108 may enable the user to configure the backup time by selecting backup time 430.

In the examples discussed above, the user may select one of buttons storage identification 422, backup connection 424, bandwidth limitation 426, encryption 428, and/or backup time 430 to configure various settings. Additionally, or alternatively, enablement module 108 may partially or entirely propose or select these settings based on or more predefined factors, rules, and/or heuristics. For example, enablement module 108 may autonomously apply default settings for any of those represented by buttons storage identification 422, backup connection 424, bandwidth limitation 426, encryption 428, and/or backup time 430. The user may also manage, override, or alter the default settings.

Enablement module 108 may similarly propose or apply a default selection of one or more traditional data backup options for a selected storage unit(s). The default selection may include any permutation of data backup 412, data snapshot 414, and/or other traditional backup options. Enablement module 108 may propose or apply the default options to a storage unit without the user selecting the options, such as by selecting options in data protection policy options 410.

Returning to FIG. 3, at step 308 one or more of the systems described herein may enable the user to configure, through the user interface, the data protection policy to schedule a data transfer operation from the storage unit to an additional storage unit. The data transfer operation may include at least one of a replication operation and a continuous data protection operation. For example, at step 308 enablement module 108 may enable the user to configure, through the user interface, the data protection policy to schedule replication or continuous data protection.

Enablement module 108 may enable the user to schedule the data transfer operation in a variety of manners. For example, enablement module 108 may discover replication capabilities of the storage unit. Discovering replication capabilities may include verifying that a storage unit is configured for replication. Discovering replication capabilities may also include ascertaining which types of replication are available. Enablement module 108 may further enable the user to configure replication based on the discovered replication capabilities.

Scheduling the data transfer operation may include selecting at least one of synchronous replication, asynchronous replication, and periodic replication. Synchronous replication may ensure that the primary and secondary storage units are maintained in a synchronous state. Asynchronous replication may permit some lag between changes at the primary storage unit and synchronization with the secondary storage unit. Periodic replication may synchronize the primary and secondary storage units at a fixed or dynamic periodicity. Scheduling the data transfer operation may include selecting an update frequency for periodic replication.

Enablement module 108 may enable the user to schedule the data transfer operation at least in part by receiving a user selection from the range of data protection options indicating replication of the storage unit. For example, briefly returning to FIG. 4, the user may select the option for replication 416 to designate replication of the primary storage unit.

Figure 5:
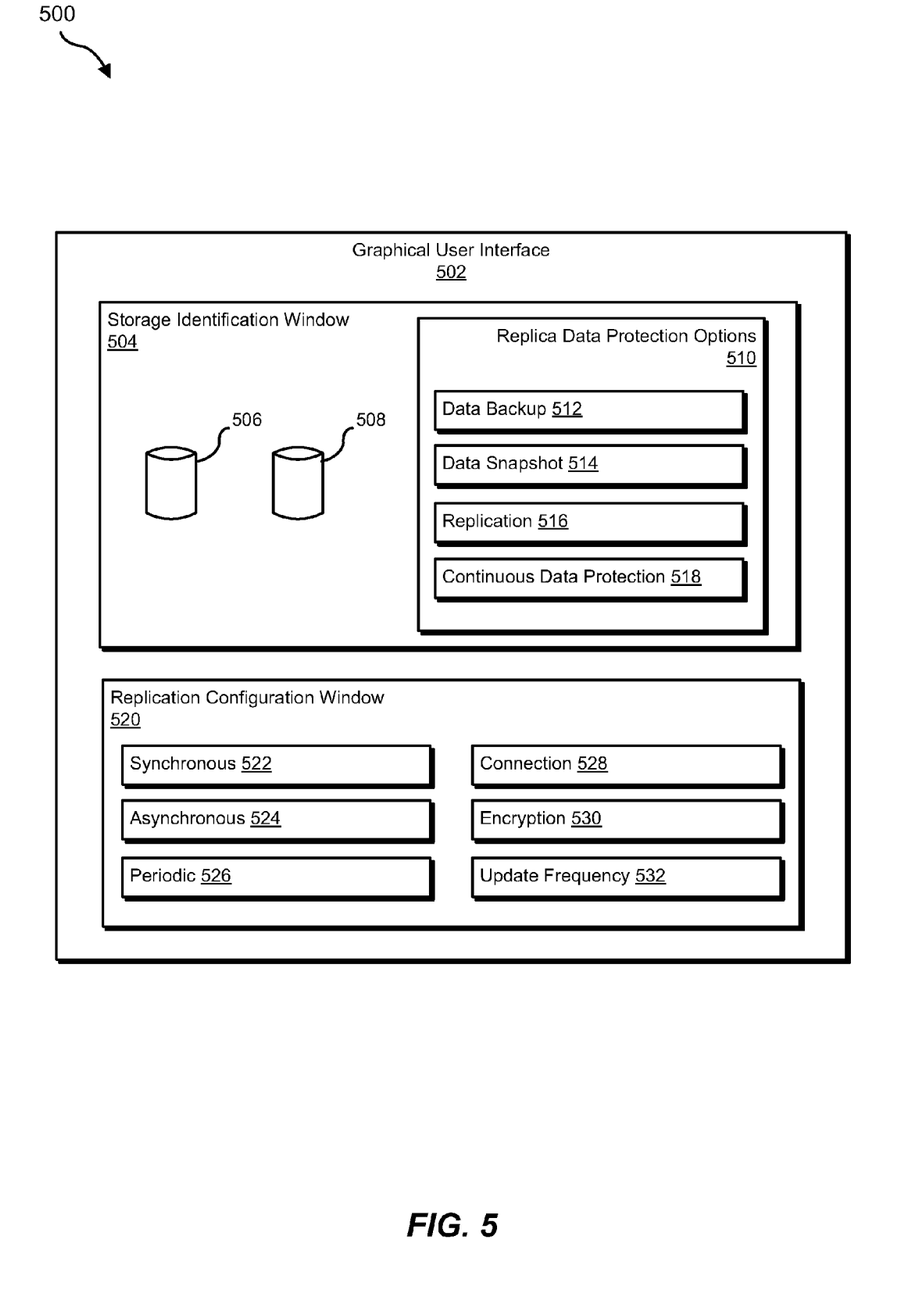
FIG. 5 is a block diagram of a modified version of the exemplary graphical user interface of FIG. 4.

FIG. 5 includes a block diagram 500 of a graphical user interface 502 that represents a modified version of the graphical user interface 402 in FIG. 400. In contrast to FIG. 4, which illustrated configuration of a traditional data backup, FIG. 5 illustrates configuration of replication. Enablement module 108 may modify the graphical user interface to appear like graphical user interface 502 in response to the user's selection of replication.

FIG. 5 includes a replication configuration window 520. Replication configuration window 520 may include buttons for synchronous 522, asynchronous 524, and periodic 526, and update frequency 532, as well as connection 528 and encryption 530. The buttons for connection 528 and encryption 530 may function parallel to backup connection 424 and encryption 428 in FIG. 4. The user may select between synchronous replication, asynchronous replication, and periodic replication using buttons synchronous 522, asynchronous 524, and periodic 526. The user may also select an update frequency for periodic replication by selecting update frequency 532 in FIG. 5.

Enabling the user to schedule the data transfer operation may further include receiving user input designating a storage device for the additional storage unit to which the storage unit will be replicated. In the example of FIG. 5, as shown in storage identification window 504, enablement module 108 may receive user input designating the icon for storage unit 508 for the additional storage unit to which the storage unit 506 will be replicated.

Enablement module 108 may further visually depict the additional storage unit as a separate replica of the storage unit in the user interface. Visually depicting the additional storage unit as a separate replica may include visually depicting the additional storage unit as a separate replica in response to receiving user input that configures replication of the storage unit.

For example, in response to user input designating a particular storage unit as the replica (e.g., by identifying a storage unit in a graphical representation of a hierarchical file system), enablement module 108 may display or alter an icon for the designated storage unit to indicate that the storage unit now represents a replicate of the primary storage unit. In the example of FIG. 5, enablement module 108 may originally display, or alter, the icon for storage unit 508 to indicate that storage unit 508 is now configured as a replica of storage unit 506 to which protected data is replicated. For example, enablement module 108 may label the icon as a replica or indicate the replication-relationship between the storage units using lines, arrows, colors, or any other appropriate graphic.

By enabling both traditional data backup and the less traditional data transfer operation, the user interface may allow a user to more easily manage and coordinate both types of data protection. By graphically depicting the additional storage unit as a replica, the user may perform further data protection operations on the replica. For example, the additional storage unit comprises a replica of the storage unit. Enablement module 108 may configure a data protection operation on the storage unit using the replica as a source.

In the example of FIG. 5, data protection policy options 410 (which applied to a primary storage unit) has been replaced with replica data protection options 510. Replica data protection options 510 may enable the user to perform data protection options directly on the replica. These options may include data backup 512, data snapshot 514, replication 516, and continuous data protection 518. Because, under replication, storage unit 508 (e.g., a secondary storage unit) is a replica of storage unit 506 (e.g., a primary storage unit), performing data protection operations on storage unit 508 may further protect the same data without increasing the burden on storage unit 506. Performing data protection operations on the replica (and replicas of replicas, etc.) may also create strings of backups and/or replicas for further redundancy and reliability.

The user interface may enable the user to both perform a traditional data backup from a primary storage unit to another storage unit, while simultaneously performing replication or continuous data protection of both the primary storage unit and the traditional data backup to a secondary replica. Replication of the traditional data backup may be performed automatically upon configuring replication of the primary storage unit. Alternatively, the user may need to separately configure replication of the traditional data backup in addition to configuring replication of the primary storage unit.

As with FIG. 4, enablement module 108 may automatically, or autonomously, propose or apply settings (e.g., default settings) that the user might otherwise select using graphical user interface 502.

As explained above, the systems and methods described in this application may enable a user to manage, in the same policy and/or user interface, traditional data backup or snapshot operations as well as less traditional data transfer operations for the same storage unit or other computing system. The less traditional data transfer operations may include replication and/or continuous data protection. The systems and methods described herein may also enable a user to more easily manage traditional data backup or snapshot operations, as well as less traditional data transfer operations, on replicas of primary storage units.

Figure 6:
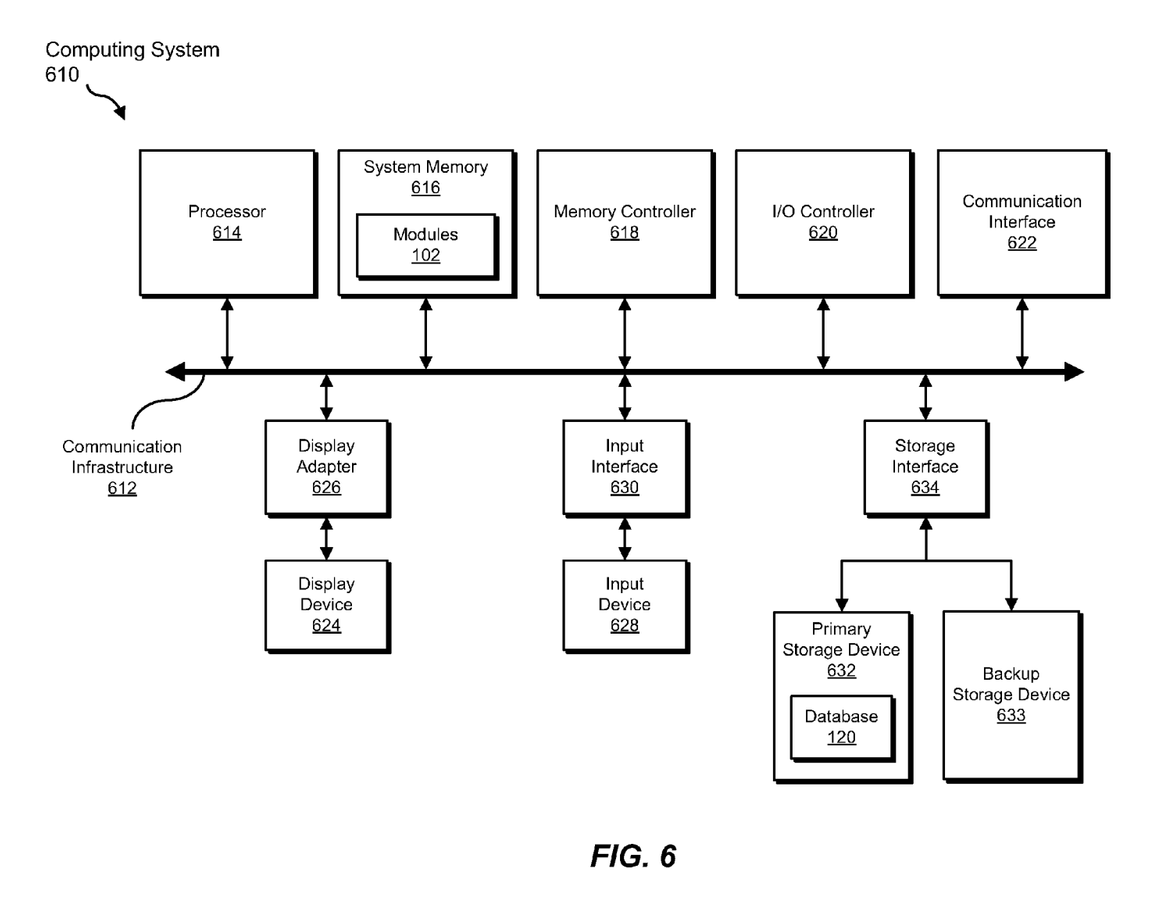
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the providing, selecting, enabling, displaying, discovering, receiving, taking, and depicting steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
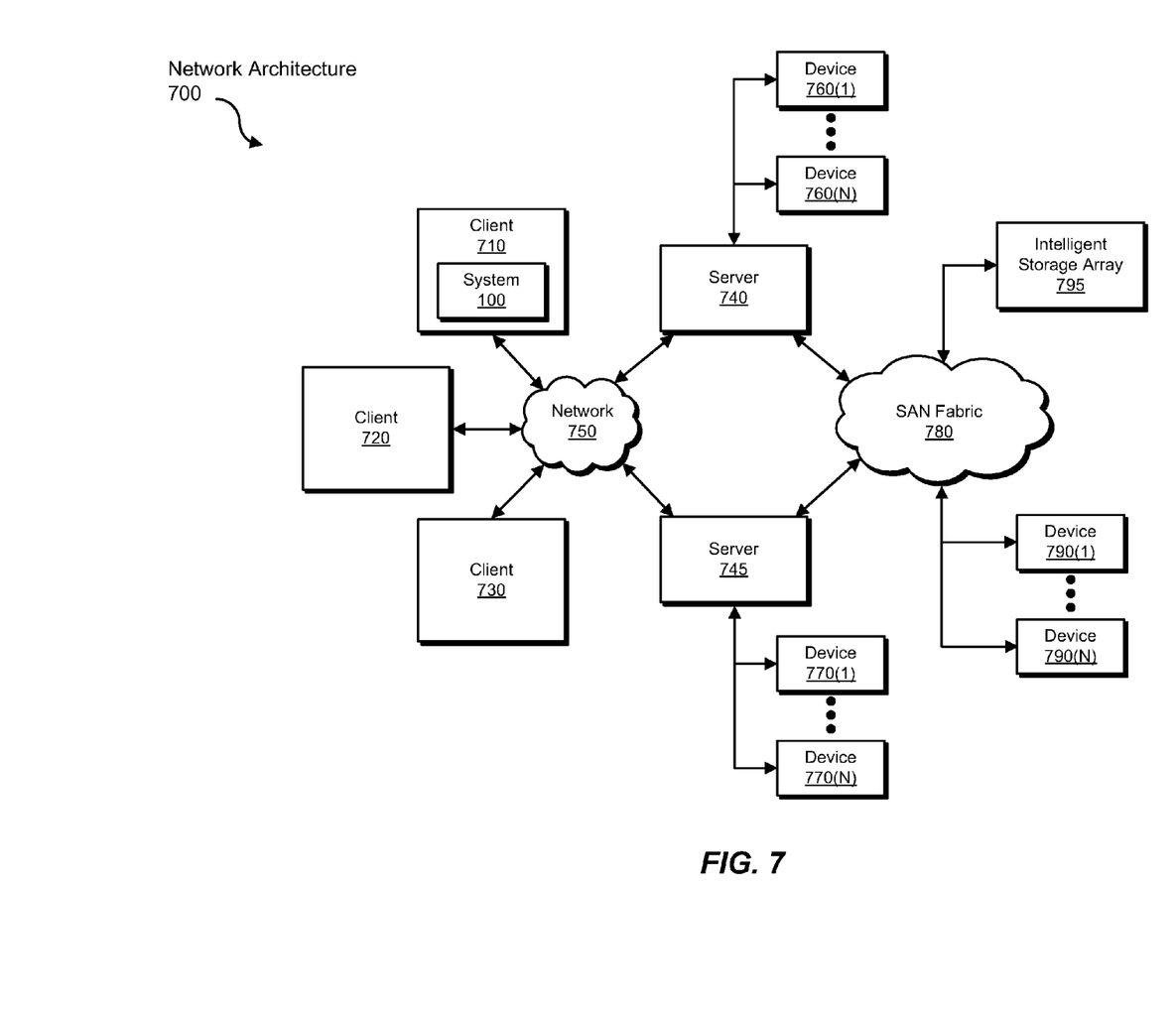
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the providing, selecting, enabling, displaying, discovering, receiving, taking, and depicting steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for managing data protection of storage units.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform storage units from being in an unsynchronized state, without replication, to a synchronized state under replication. One or more modules may also physically alter output devices including visual and audio devices to interface with a human user.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing data protection of storage units, at least a portion of the method being performed by a computing device comprising at least one processor, the method comprising:
    providing a user interface that enables a user to configure data protection policies for storage units;
    selecting at least one storage unit for data protection;
    enabling the user to configure, through the user interface, a data protection policy to schedule a data backup of the storage unit;
    enabling the user to configure, through the same user interface, the same data protection policy to schedule a data transfer operation from the storage unit to an additional storage unit,
        the data transfer operation comprising a replication operation;
    visually depicting the additional storage unit in the same user interface as a separate replica of the storage unit upon configuring the data transfer operation;
    enabling the user to configure a snapshot on data of the storage unit using the replica as a source.

2. The computer-implemented method of claim 1, wherein scheduling the data transfer operation comprises:
    discovering replication capabilities of the storage unit;
    enabling the user to configure replication based on the discovered replication capabilities.

3. The computer-implemented method of claim 1, wherein scheduling the data transfer operation comprises selecting at least one of synchronous replication, asynchronous replication, and periodic replication.

4. The computer-implemented method of claim 3, wherein scheduling the data transfer operation comprises selecting an update frequency for the periodic replication.

5. The computer-implemented method of claim 1, wherein enabling the user to configure the data protection policy to schedule the data backup and the data transfer operation comprises:
    receiving a user selection of the storage unit;
    displaying a range of data protection options in response to receiving the user selection, wherein the range of data protection options includes both the data backup and the data transfer operation.

6. The computer-implemented method of claim 5, wherein enabling the user to schedule the data transfer operation comprises:
    receiving the user selection from the range of data protection options indicating replication of the storage unit;
    receiving user input designating a storage device for the additional storage unit to which the storage unit will be replicated.

7. The computer-implemented method of claim 1, further comprising, in response to user input designating the additional storage unit as the replica, altering an icon for the additional storage unit.

8. The computer-implemented method of claim 1, further comprising, in response to user input designating the additional storage unit as the replica, displaying an icon for the additional storage unit.

9. The computer-implemented method of claim 8, wherein displaying the icon for the additional storage unit comprises labeling the icon as the replica.

10. The computer-implemented method of claim 1, wherein the data backup and replication are distinct in that replication maintains the storage unit and the additional storage unit in a substantially synchronized state whereas the data backup does not.

11. The computer-implemented method of claim 1, wherein the data backup and replication are distinct in that replication ensures that replication of a write operation is performed to the additional storage unit before the write operation is actually performed on the storage unit whereas the data backup does not.

12. A system for managing data protection of storage units, the system comprising:
    a provisioning module programmed to provide a user interface that enables a user to configure data protection policies for storage units;
    a selection module programmed to select at least one storage unit for data protection;
    an enablement module programmed to:
        enable the user to configure, through the user interface, a data protection policy to schedule a data backup of the storage unit;
        enable the user to configure, through the same user interface, the same data protection policy to schedule a data transfer operation from the storage unit to an additional storage unit, the data transfer operation comprising a replication operation;
        visually depict the additional storage unit in the same user interface as a separate replica of the storage unit upon configuring the data transfer operation;
        enable the user to configure a snapshot on data of the storage unit using the replica as a source;
    at least one hardware processor configured to execute the provisioning module, the selection module, and the enablement module.

13. The system of claim 12, wherein the enablement module is programmed to enable the user to configure the data protection policy to schedule the data transfer operation at least in part by:
    discovering replication capabilities of the storage unit;
    enabling the user to configure replication based on the discovered replication capabilities.

14. The system of claim 12, wherein the enablement module is programmed to enable the user to configure the data protection policy to schedule the data transfer operation at least in part by selecting at least one of synchronous replication, asynchronous replication, and periodic replication.

15. The system of claim 14, wherein the enablement module is programmed to enable the user to configure the data protection policy to schedule the data transfer operation at least in part by selecting an update frequency for the periodic replication.

16. The system of claim 12, wherein the enablement module is configured to enable the user to configure the data protection policy to schedule the data backup and the data transfer operation at least in part by:
    receiving a user selection of the storage unit;
    displaying a range of data protection options in response to receiving the user selection, wherein the range of data protection options includes both the data backup and the data transfer operation.

17. The system of claim 16, wherein the enablement module is configured to enable the user to configure the data protection policy to schedule the data transfer operation at least in part by:

receiving the user selection from the range of data protection options indicating replication of the storage unit;

receiving user input designating a storage device for the additional storage unit to which the storage unit will be replicated.

18. The system of claim 12, wherein the enablement module is programmed to, in response to user input designating the additional storage unit as the replica, alter an icon for the additional storage unit.

19. The system of claim 12, wherein the enablement module is programmed to, in response to user input designating the additional storage unit as the replica, display an icon for the additional storage unit.

20. A non-transitory computer-readable-storage medium comprising one or more computer-executable instructions that, when executed by at least one processor of a computing device, cause the computing device to:

provide a user interface that enables a user to configure data protection policies for storage units;

select at least one storage unit for data protection;

enable the user to configure, through the user interface, a data protection policy to schedule a data backup of the storage unit;

enable the user to configure, through the same user interface, the same data protection policy to schedule a data transfer operation from the storage unit to an additional storage unit, the data transfer operation comprising a replication operation;

visually depict the additional storage unit in the same user interface as a separate replica of the storage unit upon configuring the data transfer operation;

enable the user to configure a snapshot on data of the storage unit using the replica as a source.

\* \* \* \* \*